W. BROWN.
SPRING WHEEL.
APPLICATION FILED MAR. 13, 1909.

968,643.

Patented Aug. 30, 1910.

2 SHEETS—SHEET 1.

W. BROWN.
SPRING WHEEL.
APPLICATION FILED MAR. 13, 1909.

968,643.

Patented Aug. 30, 1910.
2 SHEETS—SHEET 2.

Witnesses
E. P. LaGay
A. Parham

Willard Brown Inventor
By his Attorneys
Burney, Mestick & Ogden

UNITED STATES PATENT OFFICE.

WILLARD BROWN, OF BELFAST, MAINE.

SPRING-WHEEL.

968,643.  Specification of Letters Patent. Patented Aug. 30, 1910.

Application filed March 13, 1909. Serial No. 483,300.

*To all whom it may concern:*

Be it known that I, WILLARD BROWN, a citizen of the United States, and a resident of Belfast, Maine, have invented certain new and useful Improvements in Spring-Wheels, of which the following is a specification, accompanied by drawings.

This invention relates to spring wheels, but more particularly to cushion or spring hubs for the wheels, in which elastic cushioning or spring means are provided between the inner rotary member, as the axle or the sleeve thereon, and the hollow casing forming the hub.

The objects of the invention are to improve upon the construction of such spring hubs and the wheel of which the hub forms a part, and enable a spring hub to be provided, which will take up the shock in the wheel and at the same time be sufficiently rigid and strong to withstand hard usage.

Another object of the invention is to enable the parts to be constructed in a sectional manner, so that repairs may be made, if necessary, and a further object of the invention is to exclude dust and dirt from the interior of the hub, and its connected parts.

The wheel may be constructed as a driving wheel or a steering wheel, as desired, and both forms of construction are shown in this application.

The invention consists of the device substantially as hereinafter fully described and claimed in this specification and shown in the accompanying drawings, in which—

Figure 1:
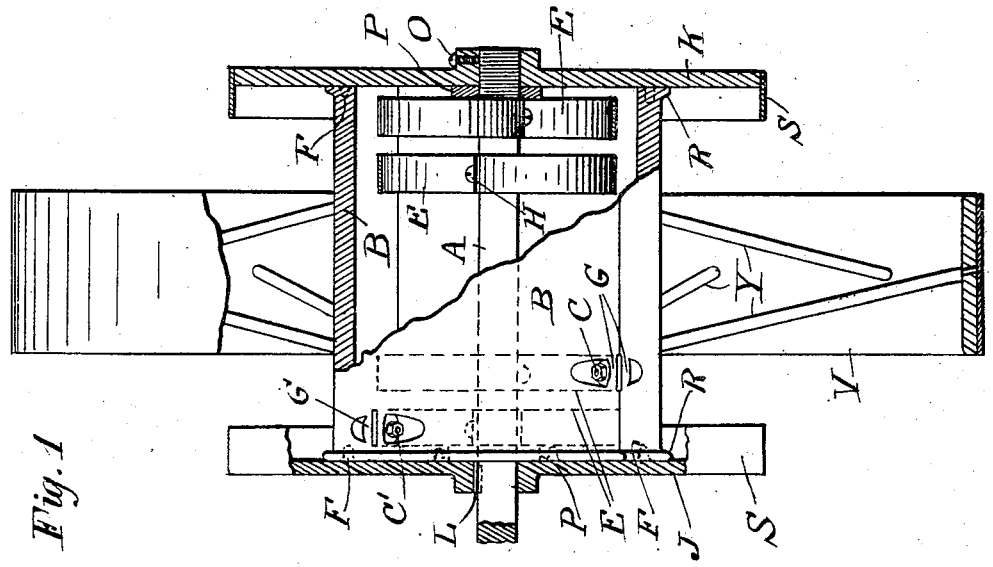
Figure 2:
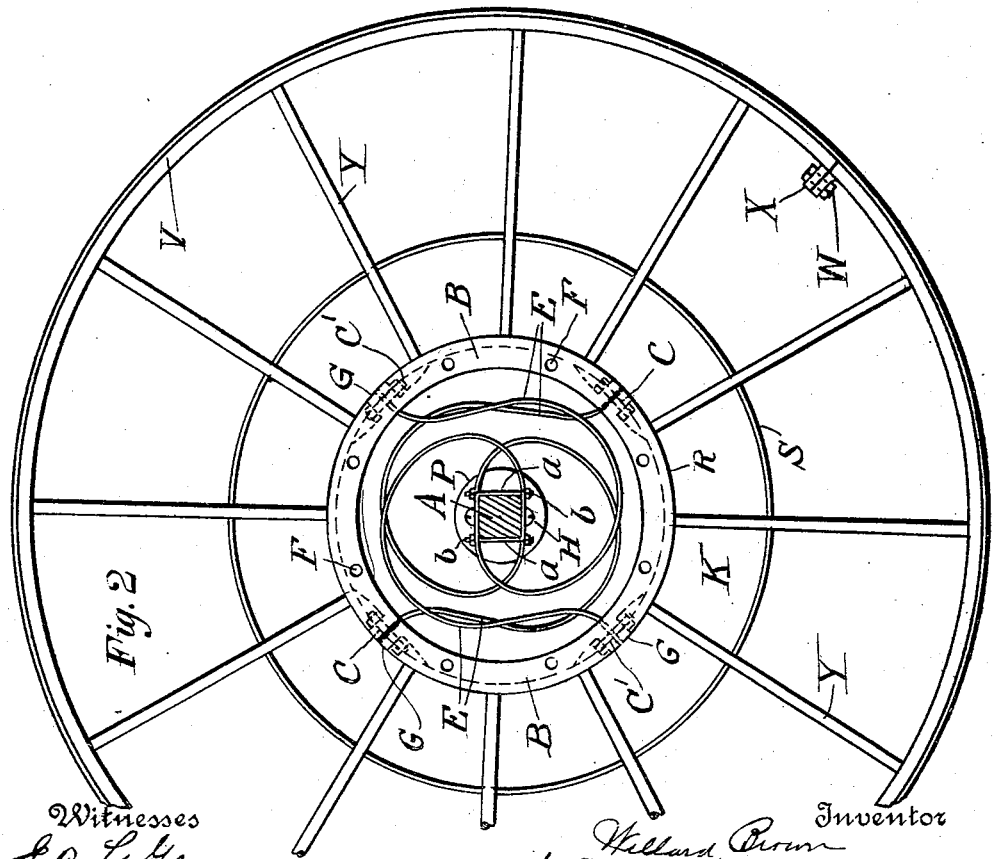
Figure 3:
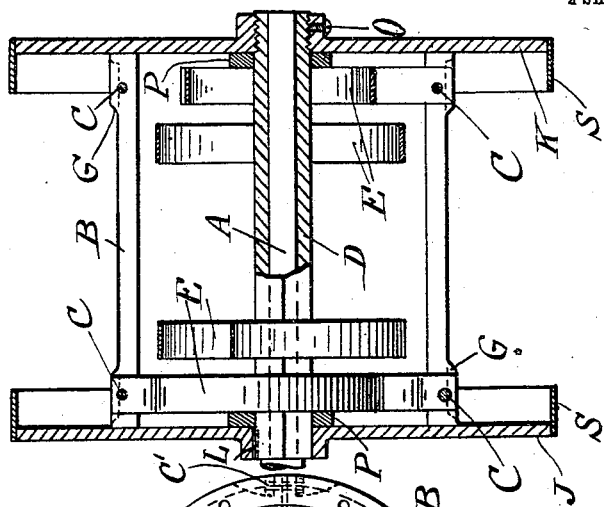
Figure 4:
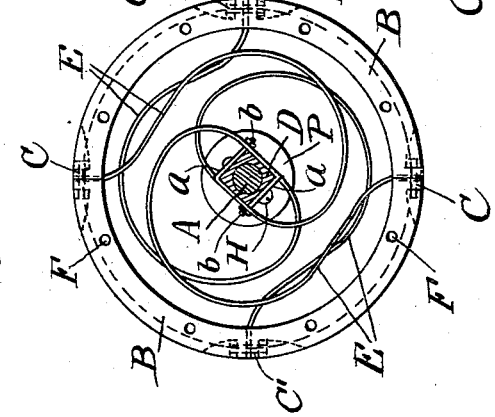
Figure 5:
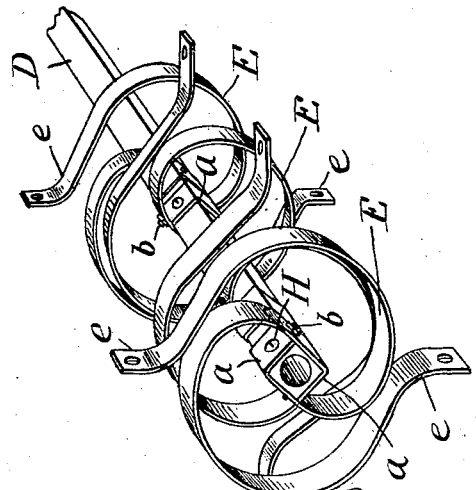

Figure 1 is a horizontal sectional view of a wheel and its hub embodying the invention, partly broken away; Fig. 2 is a side elevation of the wheel with one of the end disks of the hub removed to show the interior construction of the hub; Fig. 3 is a horizontal sectional view of a modification of the hub shown constructed for a steering wheel, partly broken away; Fig. 4 is a side elevation of the hub with one of the end disks removed; Fig. 5 is a perspective view of the springs inside of the hub.

Referring to the drawings and more particularly to Figs. 1 and 2, showing a driving wheel, A represents the axle, and B is a sectional casing forming the hub, preferably constructed in two parts adapted to be held together by the bolts C. Between the axle A and the casing B are arranged circular springs connected to both the axle and the casing and forming spring cushioning means inside of the hub. In Fig. 1 the springs are connected directly to the axle and the entire hub turns with the axle as in the case of a driving wheel, while in Fig. 3 a modification is shown for a steering wheel in which the springs are connected to a sleeve D on the axle A and the hub turns with the sleeve. Either the axle A or the sleeve D forms the inner rotary member to which the springs are connected and the principles of the invention are embodied in both forms of the device.

The springs are preferably arranged in pairs on the inner rotary member, as illustrated in the drawings, and more particularly in the perspective view in Fig. 5. Any suitable number of springs and pairs of springs may be provided, but in this instance I have shown four pairs of springs arranged side by side on the axle and on the sleeve. The springs E of each pair are connected at their inner ends to the inner rotary member as the axle or sleeve and at their outer ends to the casing B. Preferably the springs of each pair extend in the same general direction, while the springs of the adjacent pair extend in the opposite direction, because by this means increased strength and resiliency is obtained in the hub. Each spring is preferably provided with a substantially right angled bend $a$ at its inner end which clasps the axle or sleeve and the reduced end $b$ of one spring of a pair enters a slot in the other spring of said pair which forms a lock and increases the stiffness of the construction. If desired, the reduced end $b$ may be screw threaded and a nut provided to tighten the parts and hold them together. In the present instance the outer pairs of springs $e$ extend in the same general direction, while the two inner pairs of springs extend in the opposite direction to the outer pairs. The outer ends of the springs are adapted to be suitably connected to the casing B and in this instance are shown clamped by the bolts C between the meeting ends of the sections of the casing and clamped by bolts C' in slots provided for that purpose in the casing. The bolts C and C' pass through shoulders G provided in the casing, and suitable bolts H hold the springs to the inner rotary member.

End disks J and K are provided for the casing, adapted to be connected to the axle or sleeve. In Fig. 1, the disk J is connected to the axle by the key L, while the disk K is screw threaded onto the end of the axle and held by a set screw O. Between the end disks J and K and the springs are preferably provided, as illustrated, cushioning disks P of rubber. The casing B is preferably provided with a bead or rib R at each end, and the disks are preferably provided with inwardly extending dust flanges S. The bead R and flange S tend to prevent dust and dirt from entering the hub. The end faces of the casing are also provided with lubrication holes F.

In Fig. 3 the construction is substantially like that shown in Fig. 1, except for the fact that a sleeve D is provided on the end of the axle A' and the parts of the hub are connected to turn with said sleeve, while the axle remains stationary.

The rim or felly V of the wheel is preferably constructed in sections, in this instance two sections being shown, suitably connected together by the bolts W passing through lugs X. The spokes Y are suitably connected to the hub B and felly V.

All the parts of the hub and the felly and spokes are preferably constructed of steel, although any suitable material may be used.

I claim and desire to obtain by Letters Patent the following:

A cushion hub for a wheel, comprising an inner rotary member, a hollow casing surrounding the same, and circular springs arranged in pairs within the casing and connected to the rotary member and casing, the springs of each pair extending in the same direction, and the springs of adjacent pairs extending in opposite directions, whereby their points of attachment to the casing are staggered.

In testimony whereof I have signed this specification in the presence of two subscribing witnesses.

WILLARD BROWN.

Witnesses:
WALTER B. DUTCH,
JOHN H. MCAULIFFE.